US011204730B2

(12) United States Patent
Minami et al.

(10) Patent No.: US 11,204,730 B2
(45) Date of Patent: Dec. 21, 2021

(54) PRINTING DEVICE AND PROGRAM (71) Applicant: SEIKO EPSON CORPORATION, Tokyo (JP)

(72) Inventors: Takeshi Minami, Matsumoto (JP); Mitsuru Annen, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/817,233

(22) Filed: Mar. 12, 2020

(65) Prior Publication Data
US 2020/0293251 A1 Sep. 17, 2020

(30) Foreign Application Priority Data

Mar. 14, 2019 (JP) .............................. JP2019-047042

(51) Int. Cl.
G06F 3/12 (2006.01)

(52) U.S. Cl.
CPC .......... *G06F 3/1267* (2013.01); *G06F 3/1205* (2013.01); *G06F 3/1208* (2013.01); *G06F 3/1253* (2013.01); *G06F 3/1274* (2013.01)

(58) Field of Classification Search
CPC .... G06F 3/1267; G06F 3/1205; G06F 3/1208; G06F 3/1253; G06F 3/1274

USPC ....................................................... 358/1.15
See application file for complete search history.

(56) References Cited

U.S. PATENT DOCUMENTS

| 10,198,225 | B1* | 2/2019 | Joy ........................ G06F 3/1224 |
| 2005/0179926 | A1* | 8/2005 | Nishikawa ............ G06F 3/1255 358/1.13 |
| 2014/0132978 | A1* | 5/2014 | Igawa ................... G06F 3/1256 358/1.14 |
| 2015/0254029 | A1* | 9/2015 | Maeda ................. G06F 3/1234 358/1.15 |
| 2016/0274847 | A1* | 9/2016 | Suzuki ................. G06F 3/1256 |
| 2018/0275939 | A1* | 9/2018 | Kanai ................... G06F 3/1285 |
| 2018/0349068 | A1* | 12/2018 | Ozawa ................. G06F 3/1238 |

FOREIGN PATENT DOCUMENTS

JP 2009-029087 2/2009

* cited by examiner

*Primary Examiner* — Allen H Nguyen
(74) *Attorney, Agent, or Firm* — Workman Nydegger (57) ABSTRACT A printing device includes a printing device communication section configured to receive a print job sent from a host device, a print mechanism configured to perform printing of the received print job, and a printing device control section configured to receive an operation to change a setting of the print job and issue an instruction to send a changed print job in which the setting of the print job has been changed to the host device that is the sender of the print job.

7 Claims, 8 Drawing Sheets

| SENT DATE AND TIME | FILE NAME | DESTINATION | CONTENT |
|---|---|---|---|
| 03/03/2019 12:00:00 | JOB001 | P001 | CON001 |
| 03/03/2019 12:12:00 | JOB002 | P001 | CON002 |

| RECEIVED DATE AND TIME | FILE NAME | SENDER | VARIABLE ITEMS | SETTINGS IN PRINTING |
|---|---|---|---|---|
| 03/03/2019 12:00:00 | JOB001 | H001 | COLOR DENSITY SCALE | COLOR: COLOR DENSITY: MEDIUM SCALE: 100% |
| 03/03/2019 12:12:00 | JOB002 | H001 | COLOR DENSITY | COLOR: MONOCHROME DENSITY: DARK |
| 03/03/2019 12:24:00 | JOB005 | H002 | COLOR DENSITY | COLOR: COLOR DENSITY: MEDIUM |

PRINTING DEVICE AND PROGRAM

The present application is based on, and claims priority from JP Application Serial Number 2019-047042, filed Mar. 14, 2019, the disclosure of which is hereby incorporated by reference herein in its entirety.

BACKGROUND

1. Technical Field

The present disclosure relates to a printing device and a program.

2. Related Art

When an error occurs in receiving a print job from a host device, an example printing device disclosed in JP-A-2009-029087 stores the print job as invalid data, and in response to a request from the host device, reads the invalid data. With this configuration, from the host device, the printing device can receive a corrected print job that is created by correcting the invalid data and perform printing of the received corrected print job.

In the technique in JP-A-2009-029087, however, if the error is not detected right after the printing device has received the print job from the host device, the printing device cannot respond to the request from the host device. As a result, when a print product is produced without errors but the print product is not the one intended by the user, it is not possible to change the settings of the print job and perform reprinting after the time has passed since the printing device received the print job.

SUMMARY

According to an aspect of the present disclosure, a printing device includes a receiver configured to receive a print job sent from a host device, a print section configured to perform printing of the received print job, a storage configured to associate job information for identifying the print job, after the printing of the print job, with host information for identifying the host device that has sent the print job and store the associated information, and a controller configured to receive a setting change operation to the print job from a user, and issue an instruction to send a changed print job in which a setting of the print job has been changed to the host device that has been identified by the host information associated with the job information about the print job. The storage "after the printing of the print job, stores" means that the storage stores the information after the printing of the print job", and the storage section may store the information before the printing of the print job or during the printing of the print job.

According to another aspect of the present disclosure, a non-transitory computer-readable storage medium storing a program is provided. The program causes a computer to function as an acquisition section configured to acquire a content, a first transmission control section configured to create a print job based on the acquired content and send the created print job to a printing device, a storage control section configured to instruct a storage section to store at least one of the acquired content and the created print job, and in accordance with at least one of an instruction to delete the content and an instruction to delete the print job, delete at least one of the content and the print job from the storage section, and a second transmission control section configured to receive an instruction to change a setting of the print job, read, from the storage section, a target print job that is the print job to be a target of the setting change instruction or the content for creating the target print job, create a changed print job in which the setting of the target print job has been changed, and send the created changed print job to the printing device.

DESCRIPTION OF EXEMPLARY EMBODIMENTS

Figure 1:
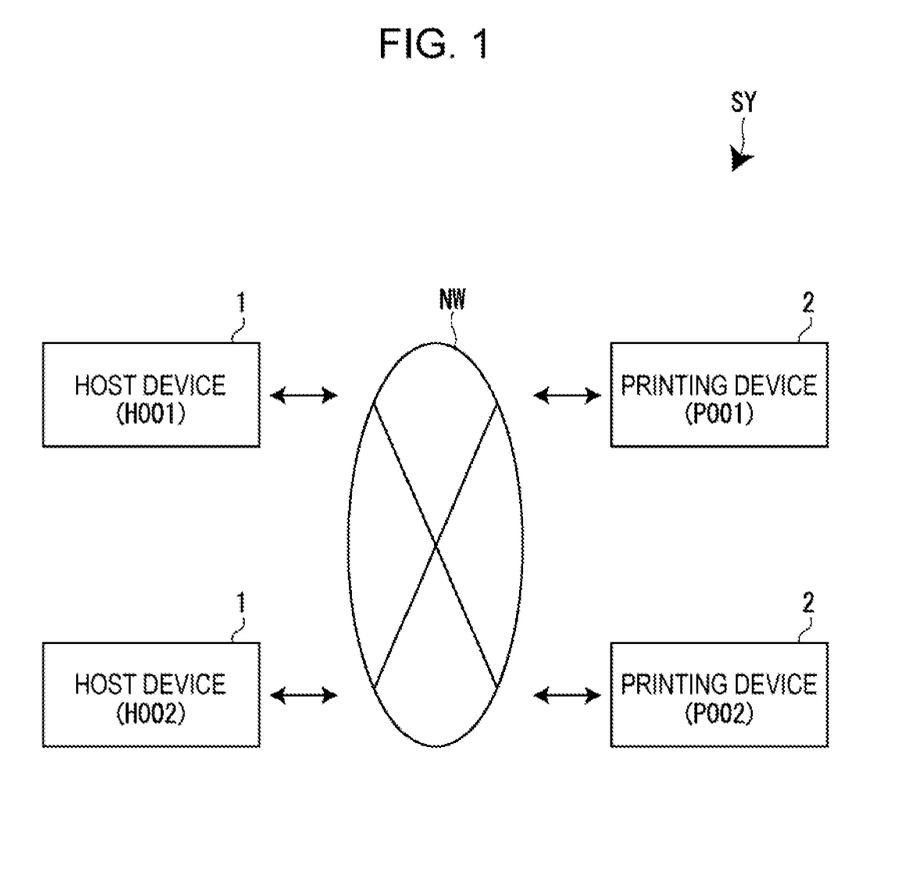
FIG. 1 is a system configuration diagram illustrating a printing system.

Hereinafter, a printing device and a program according to an embodiment will be described with reference to the attached drawings. FIG. 1 is a system configuration diagram illustrating a printing system SY. The printing system SY includes at least one host device 1 and at least one printing device 2, and the devices are connected via a network NW. The network NW is, for example, a local area network (LAN) or an Internet communication network.

In this embodiment, the printing system SY includes the host device 1 comprising a host device 1 having a host device ID "H001" and a host device 1 having a host device ID "H002". In this embodiment, the printing system SY includes the printing device 2 comprising a printing device 2 having a printing device ID "P001" and a printing device 2 having a printing device ID "P002".

In the printing system SY, the host device 1 creates a print job and sends the created print job to the printing device 2. Based on the print job sent from the host device 1, the printing device 2 performs printing on a print medium such as copy paper to create a print product. Hereinafter, a print product created without a user operation on the printing device 2 side is referred to as "first print product". When a first print product created by the printing device 2 is not a desired print result, the user performs an operation to the printing device 2 to change a setting of the print job used for the printing of the first print product. Hereinafter, the operation is referred to as "setting change operation".

Based on the setting change operation from the user, the printing device 2 issues an instruction for changing a setting of the print job to the host device 1. The host device 1 creates a changed print job in which the print job setting has been changed, and sends the created print job to the printing device 2. Based on the changed print job, the printing device 2 performs printing on a print medium to create a second print product that has settings different from those of the first print product. With this configuration, the user can perform a setting change operation to the printing device 2 to obtain a second print product having settings different from those of the first print product. The user can, accordingly, instruct the printing device 2 to perform reprinting only by operating the printing device 2 without returning to the location of the host device 1 to change the settings of the print job and entering again a print instruction to the printing device 2.

Figure 2:
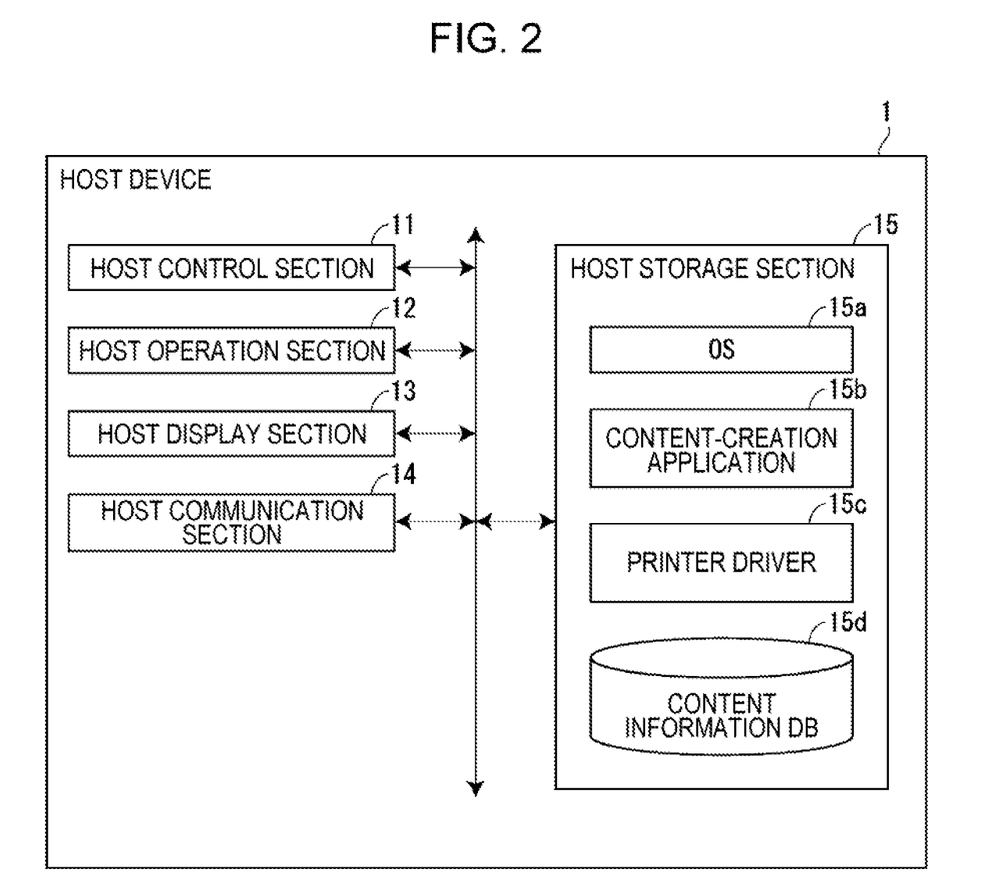
FIG. 2 is a block diagram illustrating a hardware configuration of a host device.

With reference to FIG. 2 to FIG. 5, hardware configurations of the host device 1 and the printing device 2 will be described. FIG. 2 is a block diagram illustrating a hardware configuration of the host device 1. The host device 1 is, for example, a personal computer (PC), and includes a host control section 11, a host operation section 12, a host display section 13, a host communication section 14, and a host storage section 15. The host control section 11 is an example "computer".

The host control section 11 includes a processor such as a central processing unit (CPU), a read-only memory (ROM), and a random access memory (RAM), and controls components in the host device 1. The host control section 11 may be a processor other than the CPU or may be a hardware circuit such as an application-specific integrated circuit (ASIC). A processor in the host control section 11 may include, for example, at least one CPU and a hardware circuit such as an ASIC that cooperate with each other.

The host operation section 12 is, for example, a keyboard or a mouse, and is used for various operations such as editing of contents by using a content-creation application 15b or a print instruction. The host display section 13 is, for example, a liquid crystal display, and is used to display various kinds of information such as a screen for operating the content-creation application 15b. The host communication section 14 communicates with the printing device 2 via the network NW.

The host storage section 15 is, for example, a hard disk drive (HDD), and is used to store an operating system (OS) 15a, the content-creation application 15b, a printer driver 15c, and a content information database 15d. The host storage section 15 is an example "storage". The printer driver 15c is an example "program".

The OS 15a is basic software for operating various application programs. The content-creation application 15b is an application program for creating a content for an image, a document, or the like.

The printer driver 15c is an application program for controlling the printing device 2. The host control section 11 reads the printer driver 15c from the host storage section 15 and executes the printer driver 15c and thereby functions as a "acquisition section", a "first transmission control section", a "storage control section", and a "second transmission control section".

Figure 3:
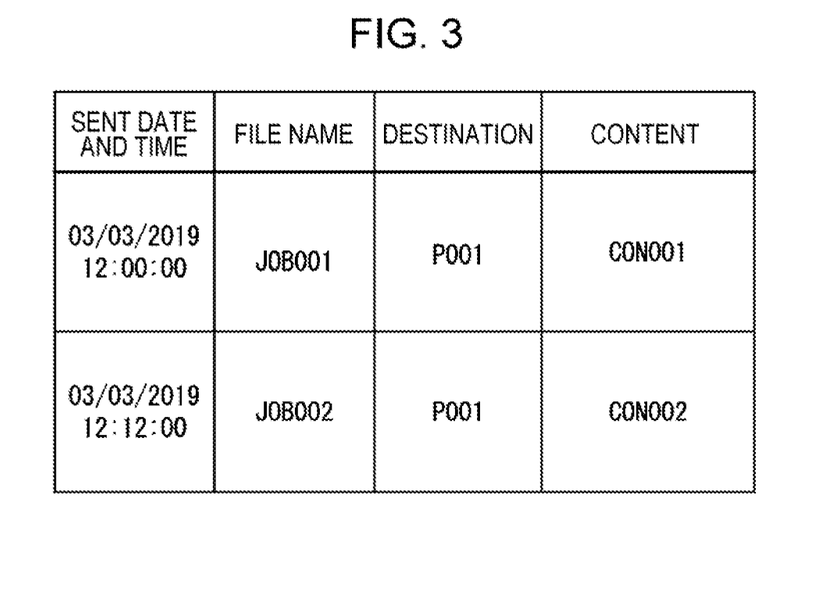
FIG. 3 illustrates a content information database.

The content information database 15d is a database for storing a content used for creation of a print job. FIG. 3 illustrates the content information database 15d. As illustrated in FIG. 3, the content information database 15d stores content information about associated "sent date and time", "file name", "destination", and "content". The content information database 15d illustrated in FIG. 3 is an example content information database 15d stored in the host device 1 having the host device ID "H001".

The "sent date and time" is the date and time a print job is sent to the printing device 2. The "file name" is a file name of a print job sent to the printing device 2. The file name of the print job is example "job information". The "destination" is a printing device ID for identifying a printing device 2 to which a print job has been sent. In FIG. 3, for example, "P001" is used as a printing device ID; however, an IP address of a printing device 2 may be used. The "content" is a content used to create a print job. Each time the host control section 11 sends a print job to the printing device 2, the host control section 11 stores content information about the print job in the content information database 15d.

With the above-described configuration, the host control section 11 operates in accordance with the printer driver 15c as described below. The host control section 11 receives print settings from a user, acquires a content created by the content-creation application 15b, creates a print job based on the received print settings and the acquired content, and sends the created print job to the printing device 2. A print job is information obtained by converting a content into a program language that can be read by the printing device 2. The program language that can be read by the printing device 2 is, for example, a page description language (PDL) or an extensible markup language (XML). When the host device 1 sends a print job to the printing device 2, to the print job, the host control device 11 adds additional information including a "file name" that identifies the print job, a "sender" that identifies the host device 1, "variable items" that are setting items that can be changed, and "settings in printing" that are settings of the print job.

Figure 5:
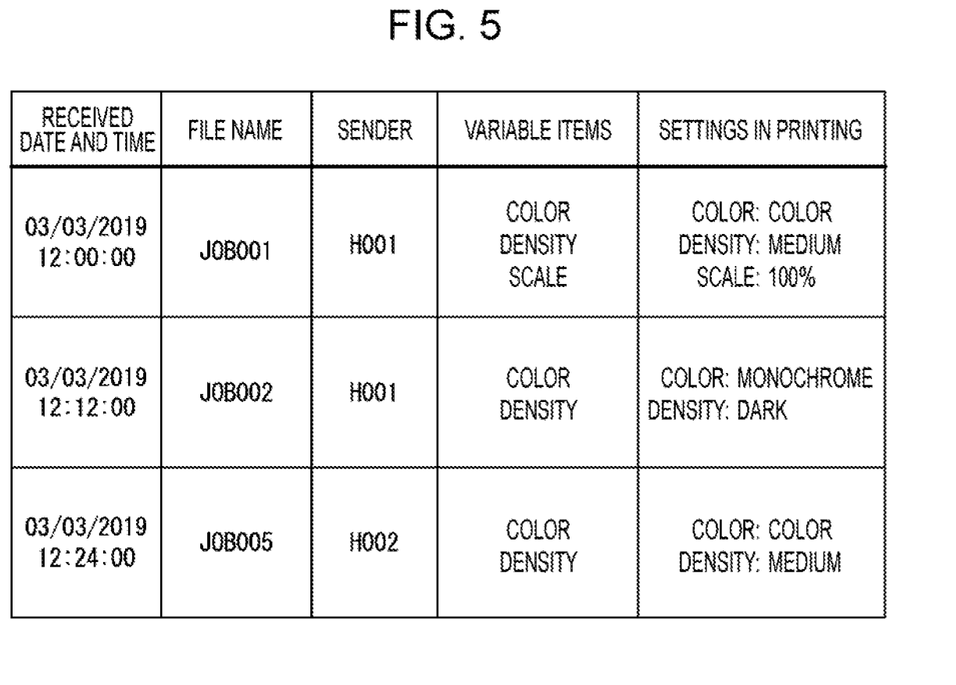
FIG. 5 illustrates a print history information database.

As the "variable items" according to the embodiment, at least one of setting items "color", "density", and "scale", or no variable setting item is designated (see FIG. 5). The host control section 11 designates these items by using the printer driver 15c. The host control section 11, for example, designates color or monochrome for the setting item "color", designates one of "dark", "medium", and "light" for the "density", and a percentage for the "scale". The host control section 11 also designates print settings designated by a user to a print job, and "variable items" depending on the type of content for creating a print job. Alternatively, the host control section 11 receives an operation for setting "variable items" from a user, adds the set "variable items" to additional information, and sends the information to the printing device 2.

For "settings in printing", at least one of the setting items "color", "density", and "scale" is designated. The host control section 11 receives print settings for these setting items from a user, adds the setting values of the setting items that are set by the user as "settings in printing" to additional information, and sends the information to the printing device 2. The "settings in printing" may be default settings instead of settings designated by a user. The host control section 11 creates a print job based on setting values of setting items that are set by a user, and sends the created print job to the printing device 2.

Meanwhile, the host control section 11 stores the acquired content in the content information database 15d, and in accordance with a content deletion instruction, deletes target content information from the content information database 15d. The content information deletion instruction is received from the printing device 2 or a user operation to the host device 1. The former case will be described below. In the latter case, for example, on a setting screen for the printer driver 15c, the host control section 11 displays at least one of options corresponding to at least one piece of information stored in the content information database 15d, and deletes content information corresponding to an option designated by a user as a deletion target among the options. In such a case, as the at least one option, the host control section 11 may display "sent date and time", "file name", "destination", or the like included in at least one item of information (see FIG. 3). When the host control section 11 deletes content information in accordance with a user operation to the host device 1, the host control section 11 notifies the "destination" of the content information about the deletion of the content information. By the notification, the printing device 2 can determine that reprinting cannot be performed based on the content information, and delete the corresponding print history information from the print history information database 25b. Instead of deleting the print history information, the printing device 2 may store information indicating that reprinting cannot be performed and may not receive an instruction of reprinting based on the deleted content information from a user.

When the host control section 11 receives a print job setting change instruction from the printing device 2, the host control section 11 reads, from the content information database 15d, a content for creating a target print job that is a print job to be a target of the setting change instruction. Based on the read content, the host control section 11 creates a changed print job in which a print job setting of the target print job has been changed, and sends the created changed print job to the printing device 2. The changed print job is an example print job.

Figure 4:
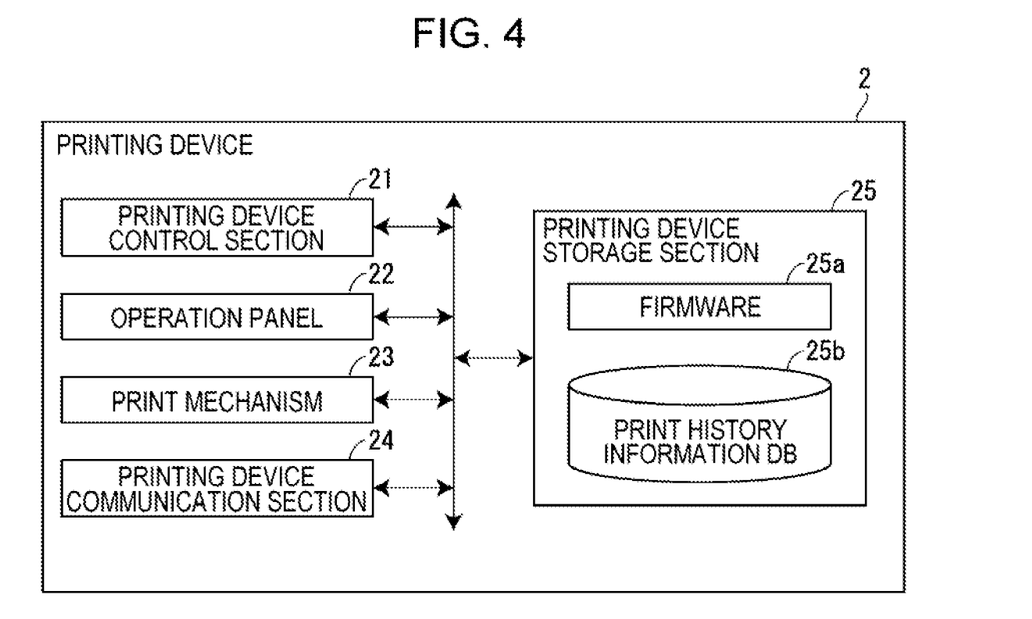
FIG. 4 is a block diagram illustrating a hardware configuration of a printing device.

FIG. 4 is a block diagram illustrating a hardware configuration of the printing device 2. The printing device 2 includes a printing device control section 21, an operation panel 22, a print mechanism 23, a printing device communication section 24, and a printing device storage section 25. The printing device control section 21 is an example "controller". The print mechanism 23 is an example "print section". The printing device communication section 24 is an example "receiver". The printing device storage section 25 is an example "storage".

The printing device control section 21 includes a processor such as a CPU, a ROM, a RAM, and the like and controls components in the printing device 2. The printing device control section 21 may be a processor other than the CPU or may be a hardware circuit such as an ASIC. The processor in the printing device control section 21 may include, for example, at least one CPU and a hardware circuit such as an ASIC that cooperate with each other.

The operation panel 22 receives various operations from a user and provides various kinds of information to the user. The operation panel 22 according to the embodiment is generally used to display a print job list screen D1 (see FIG. 8) or a print setting menu screen D2 (see FIG. 9), and to receive various operations to the screens.

The print mechanism 23 is used to perform printing to a print medium such as copy paper. The print mechanism 23 includes, for example, when the printing device 2 is an ink jet printer, an ink jet head, a head drive mechanism for driving the ink jet head, a print medium transport mechanism for transporting a print medium, and the like. When the printing device 2 is, for example, a laser printer, the printing device 2 includes a laser light source, a transfer mechanism, a print medium transport mechanism for transporting a print medium, and the like. The printing device communication section 24 communicates with the host device 1 via the network NW.

The printing device storage section 25 is, for example, a flash memory and is used to store firmware 25a and print history information database 25b. The firmware 25a is a control program for controlling the printing device 2. The printing device control section 21 reads the firmware 25a from the printing device storage section 25 and executes the firmware 25a to control the communication with the host device 1 and to control printing in the print mechanism 23.

The print history information database 25b is a database for storing print history of print jobs. FIG. 5 illustrates the print history information database 25b. As illustrated in FIG. 5, the print history information database 25b stores print history information in which "sent date and time", "file name", "sender", "variable items", and "settings for printing" are associated with each other. In the print history information, the "file name, "sender", "variable items", and "settings in printing" are information in additional information added to a print job sent from the host device 1. The print history information database 25b illustrated in FIG. 5 is an example print history information database 25b stored in the print device 2 of the print device ID "P001". The printing device adds information about a print job to print history information while receiving the print job. The printing device may add the information about the print job to the print history information at other timing, for example, after the print job has been received or after the printing of the print job has been completed.

The "received date and time" is the date and time a print job is received from the host device 1. The "file name" is a file name of a print job received from the host device 1. The "sender" is a host device ID for identifying the host device 1 that has sent the print job. The host device ID is an example "host information". In FIG. 5, for example, "H001" is used as the host device ID, but an IP address of the host device 1 may be used. The "variable items" are setting items that can be changed in settings of a print job. The "settings in printing" are setting values of setting items at the time of the printing of a print job. Each time the printing device control section 21 performs printing of a print job, the printing device control section 21 stores the print history information in the print history information database 25b.

With the above-described configuration, the printing device control section 21 operates in accordance with the firmware 25a as described below. The printing device control section 21 receives a print job sent from the host device 1, and based on the received print job, performs printing. The printing device control section 21 stores, in the print history information database 25b, print history information including a "file name" for identifying the received print job, a "sender" indicating a host device ID for identifying the host device 1 that has sent the print job, and the like.

After the printing of the print job, when the printing device control section 21 receives a setting change operation to the print job from the user, the printing device control section 21 issues, to the host device 1 that has been identified by the host device ID in the "sender" associated with the "file name" of the print job in the print history information database 25b, an instruction to send a changed print job in which a setting of the print job has been changed. Then, the printing device control section 21 provides the user with a print job list 41 (see FIG. 8) that is a print history information list stored in the print history information database 25b. The user selects a print job from the provided print job list 41, and the printing device control section 21 receives a setting change operation to the selected print job. With respect to the print job selected by the user, the printing device control section 21 provides the user with setting items that can be changed (see FIG. 9). Then, the printing device control section 21 issues, to the host device 1, an instruction to send the changed print job in which a setting item selected by the user from the presented setting items has been changed.

Furthermore, the printing device control section 21 issues, based on a user operation or automatically, an instruction for deleting a content to the host device 1. For example, the printing device control section 21 provides the user with a print job list with reference to the print history information database 25b, and in response to a selection of a print job to be deleted from the provided print job list by the user, the printing device control section 21 deletes the print history information relating to the selected print job. When the print history information is deleted from the print history information database 25b, the printing device control section 21 sends the "file name" included in the print history information to the host device 1 and issues a content deletion instruction.

Furthermore, the printing device control section 21 automatically deletes print history information that has been stored in the print history information database 25b for a predetermined period of time (for example, 24 hours) from the print history information stored in the print history information database 25b. When the number of pieces of the print history information stored in the print history information database 25b reaches an upper limit, the printing device control section 21 automatically deletes the print history information in the order of stored date and time. As described above, when the print history information is automatically deleted, the printing device control section 21 also sends the "file name" included in the print history information to the host device 1 to issue a content deletion instruction.

Next, with reference to the flowcharts in FIG. 6 and FIG. 7, normal print processing and reprint processing to be performed by the printing system SY will be described. The normal print processing is for printing of the above-described "first print product", and the reprint processing is for printing of the above-described "second print product". In these flowcharts, the operation of the host device 1 is performed mainly in accordance with the printer driver 15c.

Figure 6:
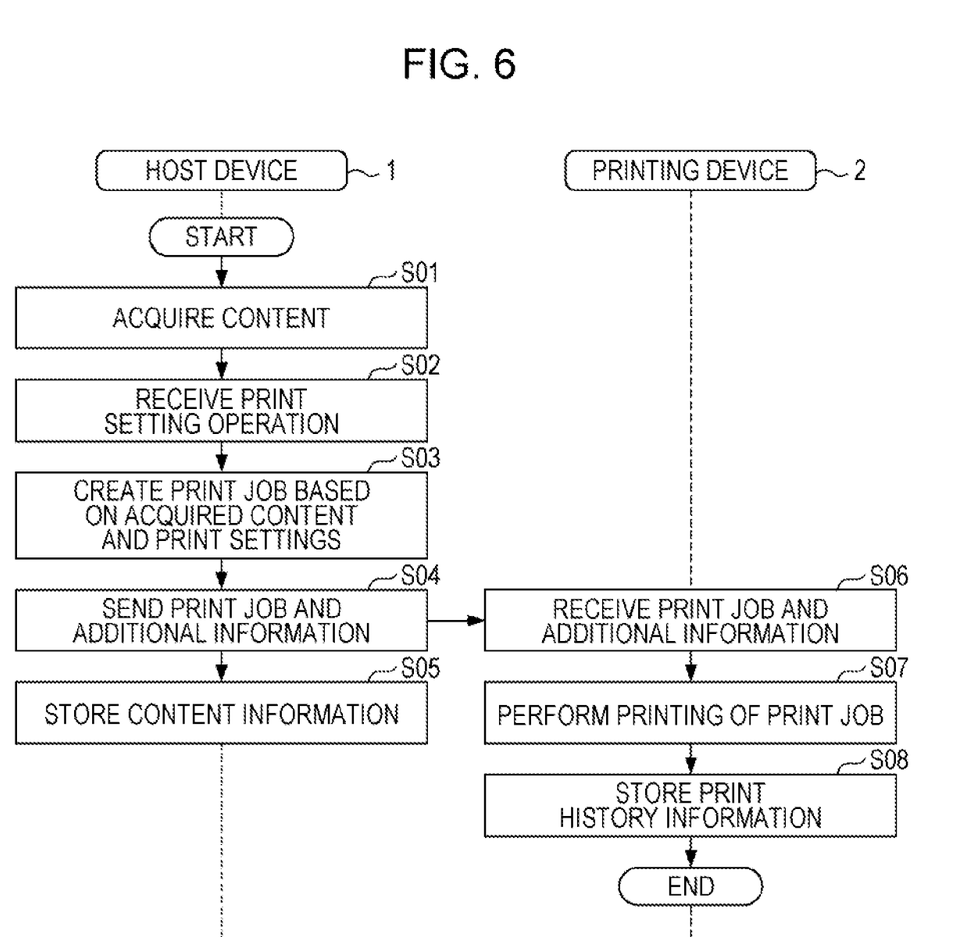
FIG. 6 is a flowchart illustrating the flow of normal print processing to be performed in a printing system.

FIG. 6 is a flowchart illustrating the flow of the normal print processing to be performed in the printing system SY. The host device 1 acquires a content created by the content-creation application 15b (S01), and receives a print setting operation from a user (S02). The print setting operation is performed, for example, to a print setting screen (not illustrated) provided by the printer driver 15c. The host device 1 creates a print job based on the acquired content and the print settings that have been set by the print setting operation (S03). The host device 1 adds additional information to the created print job, and sends the print job and the additional information to the printing device 2 (S04). As described above, the additional information includes a "file name", a "sender", "variable items" and "settings in printing". After sending the print job to the printing device 2, the host device 1 stores the content information about the print job in the content information database 15d (S05).

The printing device 2 receives the print job and the additional information from the host device 1 (S06). Then the printing device 2 performs printing of the print job (S07), and the printing device 2 stores the print history information about the print job in the print history information database 25b (S08).

Figure 7:
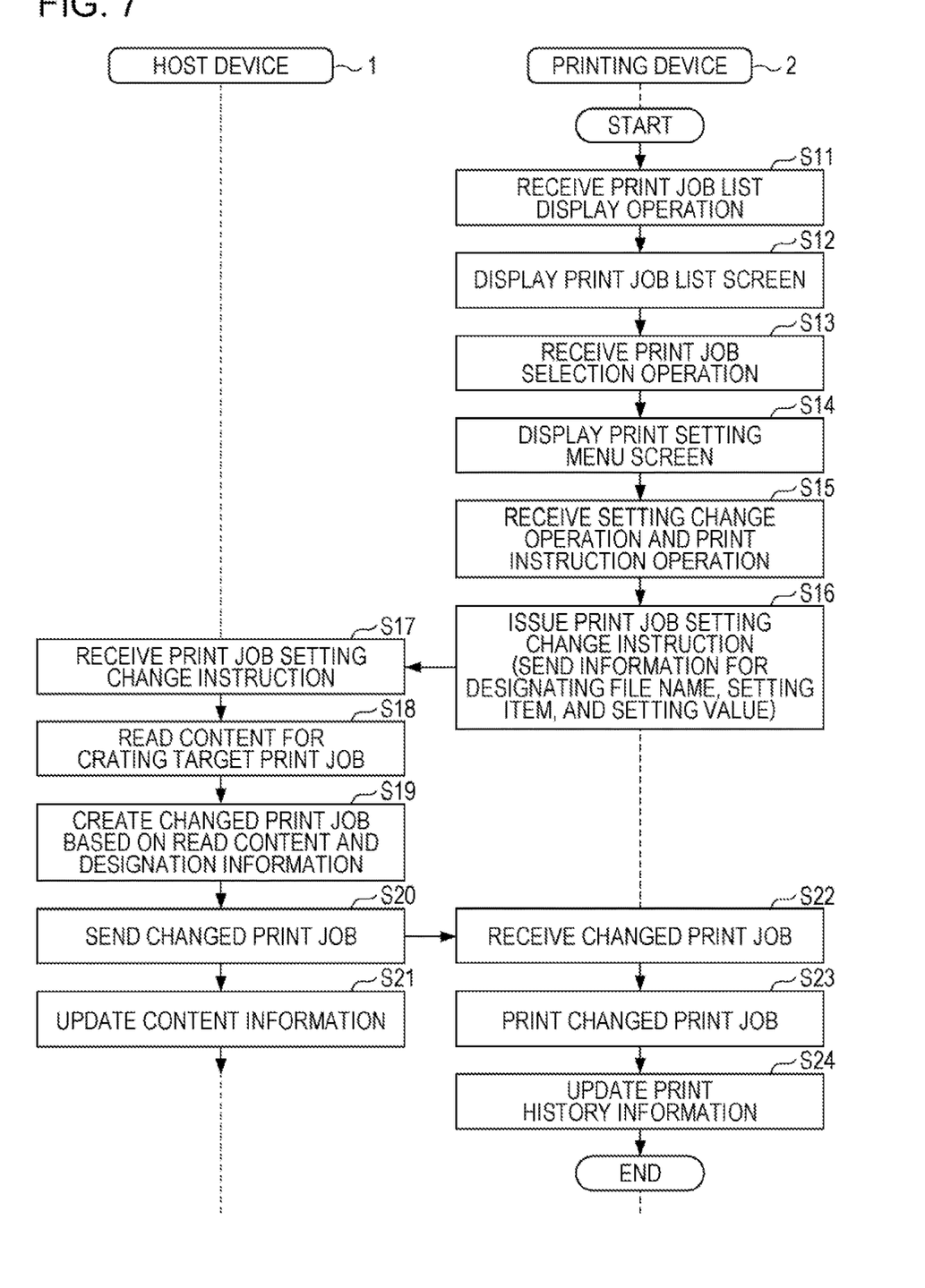
FIG. 7 is a flowchart illustrating the flow of reprint processing to be performed in a printing system.

FIG. 7 is a flowchart illustrating the flow of the reprint processing to be performed by the printing system SY. After receiving a print job list display operation from the user (S11), the printing device 2 displays the print job list screen D1 (see FIG. 8) on the operation panel 22 (S12). After receiving a print job selection operation to the print job list screen D1 (S13), the printing device 2 displays the print setting menu screen D2 (see FIG. 9) (S14). After receiving a setting change operation and a print instruction operation to the print setting menu screen D2 (S15), the printing device 2 issues an instruction for changing a setting of the print job to the host device 1 (S16). A setting change operation designates a setting item to be changed and a setting value of the setting item. In issuing the print job setting change instruction, the printing device 2 sends the host device 1 designation information including the "file name" of the job, the "setting item" to be changed, and the "setting value". The host device 1 that is the destination of the setting change instruction is identified by the host device ID of the "source" associated with the "file name" of the print job selected in step S13 in the print history information database 25b.

When the host device 1 receives the print job setting change instruction from the printing device 2 (S17), the host device 1 reads the content for creating a target print job that is a print job to be a target of the setting change instruction from the content information database 15d (S18). The target print job is identified by the "file name" in the designation information sent from the printing device 2. The host device 1 creates a changed print job based on the read content and the "setting item" and "setting value" in the designation information (S19). The host device 1 sends the created changed print job to the printing device 2 (S20). After sending the changed print job to the printing device 2, the host device 1 updates the "sent date and time" in the content information in the content information database 15d (S21). Specifically, the host device 1 rewrites the "sent date and time" associated with the "file name" of the target print job with the sent date and time of the changed print job. Instead of rewriting, the content information about the target print job may be deleted from the content information database 15d and new content information may be stored in the content information database 15d based on the changed print job.

Meanwhile, the printing device 2 receives the changed print job from the host device 1 (S22), and performs printing of the received changed print job (S23). After printing the changed print job, the printing device 2 updates the "received date and time" and "setting in printing" in the print history information in the print history information database 25b (S24). The printing device 2 rewrites the "received date and time" associated with the "file name" of the print job selected in step S13 with the received date and time of the changed print job, and rewrites the "setting in printing" with the print setting of the changed print job.

Figure 8:
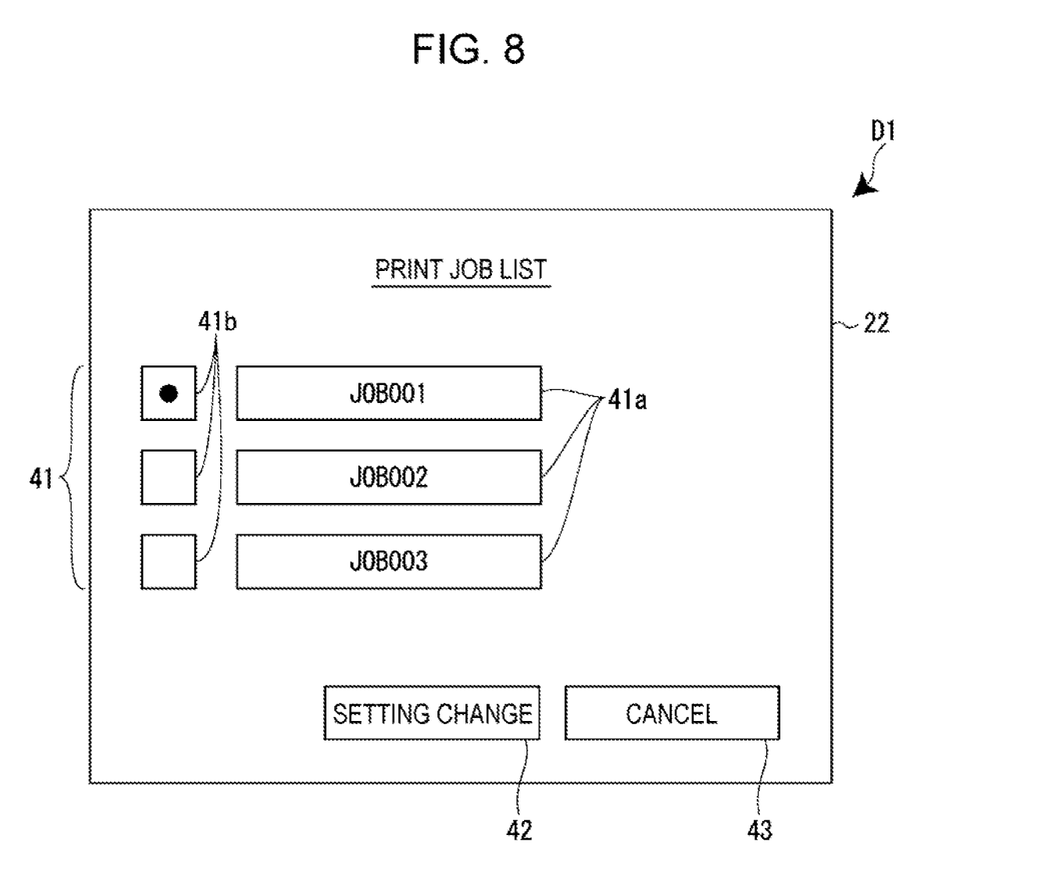
FIG. 8 illustrates an example print job list screen.
Figure 9:
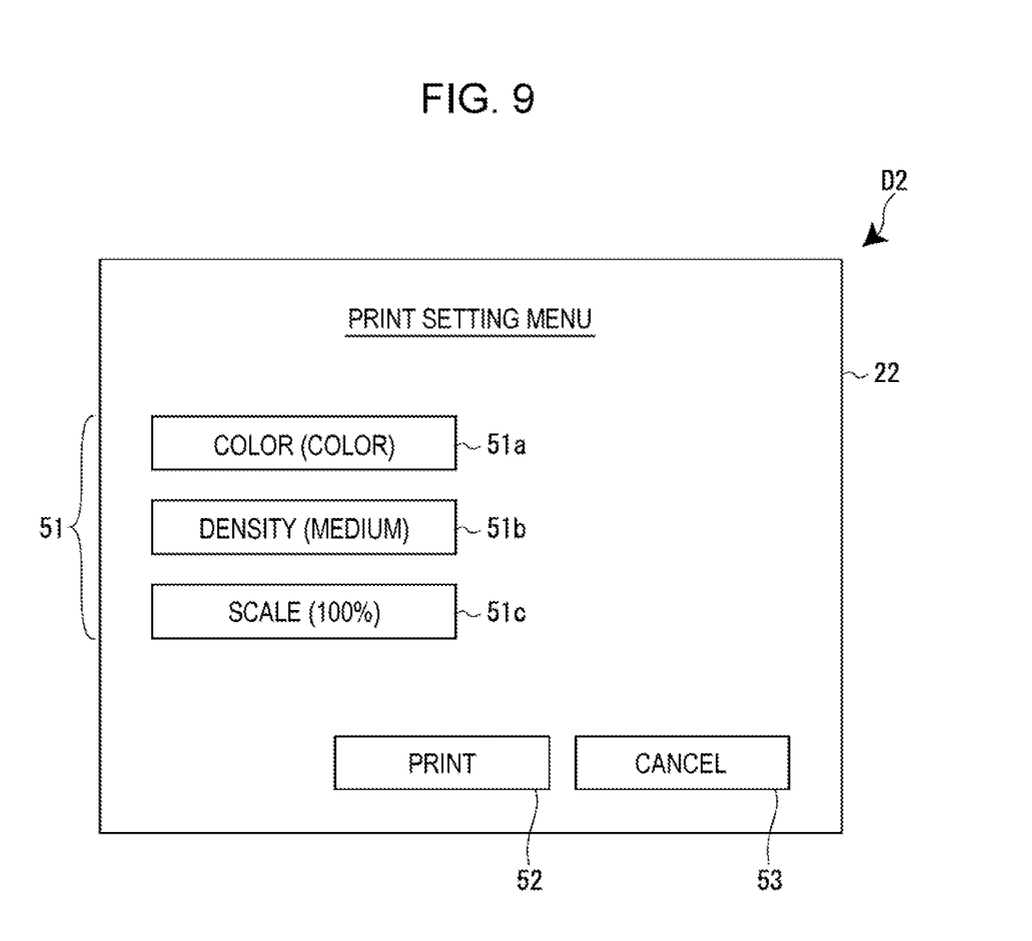
FIG. 9 illustrates an example print setting menu screen.

With reference to FIG. 8 and FIG. 9, the print job list screen D1 and the print setting menu screen D2 displayed on the operation panel 22 will be described. FIG. 8 illustrates an example print job list screen D1. FIG. 8 illustrates an example display when the information illustrated in FIG. 5 is stored in the print history information database 25b of the printing device 2.

The print job list screen D1 displays the print job list 41, a setting change button 42, and a cancel button 43. The print job list 41 includes at least one option 41a that indicates a "file name" of corresponding at least one print history information stored in the print history information database 25b (see FIG. 5). The at least one option 41a is associated with a selection box 41b. A user selects one of the at least one displayed selection box 41b to designate a print job to be reprinted, that is, a print job to be a target of a setting change operation.

When the setting change button 42 is selected while one of the at least one selection box 41b is being selected, the printing device control section 21 instructs the operation panel 22 to display a print setting menu screen D2. On the other hand, when the cancel button 43 is selected while one of the at least one selection box 41b is being selected, the printing device control section 21 cancels the selection of the print job.

FIG. 9 illustrates an example print setting menu screen D2. The example in FIG. 9 illustrates an example display provided when a print job having a file name "JOB001" is selected on the print job list screen D1 illustrated in FIG. 8. In this example, as illustrated in FIG. 5, the "variable items" associated with the print job having the file name "JOB001" are "color", "density", and "scale", and thus a print setting menu 51 for changing the settings of the setting items is displayed on the print setting menu screen D2.

The print setting menu screen D2 displays the print setting menu 51, a print button 52, and a cancel button 53. The print setting menu 51 includes a color button 51a for changing the setting of the setting item "color", a density button 51b for changing the setting of the setting item "density", and a scale button 51c for changing the setting of the setting item "scale". On the color button 51a, the density button 51b, and the scale button 51c, the "settings in printing" (see FIG. 5) associated with the print job having the file name "JOB001" are displayed. When one of the color button 51a, the density button 51b, and the scale button 51c is selected, the printing device control section 21 displays a pop-up screen (not illustrated) for setting a setting value of the setting item, and receives a setting value change operation.

When a setting value of a setting item is changed and the print button 52 is selected on the print setting menu 51, the printing device control section 21 sends the host device 1 designation information based on the "file name" of the print job selected on the print job list screen D1 and the setting values of the setting items in the print setting menu 51. On the other hand, when the cancel button 53 is selected, the printing device control section 21 cancels the settings of the print setting menu 51.

As described above, in the printing system SY according to the embodiment, when a first print product created by the printing device 2 based on a print instruction from the host device 1 is not a desired print result, the user operates the operation panel 22 of the printing device 2 to instruct to change the settings of the print job used for the printing of the first print product. In response to the instruction, the host device 1 creates a changed print job in which a print job setting has been changed, and sends the created print job to the printing device 2. Accordingly, the user can obtain a second print product with the settings different from those of the first print product. The user can, accordingly, instruct the printing device 2 to perform reprinting only by operating the printing device 2 without returning to the location of the host device 1 to change the settings of the print job and entering again a print instruction to the printing device 2.

Furthermore, the host device 1 is configured to delete a content stored in the host storage section 15 in accordance with a deletion instruction, and thus the host storage section 15 can be prevented from reaching its capacity. Furthermore, since the host device 1 can receive a deletion instruction from the printing device 2, a user can instruct the host device 1 to execute the deletion instruction without performing the deletion instruction operation to the host device 1 by performing a deletion instruction operation to the printing device 2 or by automatic determination by the printing device 2.

It is to be understood that the present disclosure is not limited to the embodiment, and modifications described below may be appropriately combined.

Modification 1

In the above-described embodiment, after the host control section 11 sends a print job to the printing device 2, the host control section 11 stores the content for creating the print job in the content information database 15d. However, instead of the content, the print job may be stored. In such a case, the host control section 11 may associate the print job sent to the printing device 2 with the "sent date and time", "file name", and "destination, and store the information as print job information in the database in the host storage section 15. In another modification, the host control section 11 may store both of the content and the print job, and create a changed print job by using one of the content and the print job depending on a setting change content designated by the printing device 2.

Modification 2

The host control section 11 may store at least one of the print job and the content for creating the print job in the content information database 15d not after sending the print job to the printing device 2 but before or at the time of sending the print job to the printing device 2. Similarly, after performing printing of the print job, the printing device control section 21 stores the print history information about the print job in the print history information database 25b; however, the printing device control section 21 may store the print history information in the print history information database 25b before or at the time of printing the print job.

Modification 3

In the above-described embodiment, the "variable items", which are setting items whose print settings can be changed, include the setting items "color", "density", and "scale". However, other setting items may be used as the "variable items", or at least one of the setting items may not be used as the "variable items". The other setting items, for example, setting items relating to paper such as paper size and paper type, and items relating to bookbinding such as binding position and layout, may be used as "variable items".

Modification 4

In the above-described embodiment, the printing device control section 21 displays the print job list screen D1 in which at least one print job in print history information stored in the print history information database 25b (see FIG. 5) is displayed as the option 41a. The printing device control section 21 may perform user authentication and display only print jobs relating to the user as the options 41a. In such a case, the host control section 11 adds a user ID for identifying the user to the print job by using the printer driver 15c. The printing device control section 21 associates the user ID with the print history information and store the user ID and the print history information in the print history information database 25b. The printing device control section 21 acquires user information, for example, by reading an ID card, and displays, as options 41a on the print job list screen D1, print jobs included in print history information associated with the user ID corresponding to the acquired user information.

Modification 5

When a communication disabled state in which communication is disabled moves to a communication enabled state in which communication is enabled, for example, when the power is turned on, in response to the movement, based on the content information database 15d or the print history information database 25b in the devices, the host device 1 and the printing device 2 described in the above embodiment inquire of the destination of the print job or the sender of the print job whether the print history or the content information has been deleted. When the reply says that the print history or the content information has been deleted, the corresponding content information or the print history information may be deleted. With this configuration, when one of the host device 1 and the printing device 2 is in a communication disabled state, if content information or print history has been deleted and reprinting cannot be performed in the other device, the print history or the content information can be deleted. Instead of the deletion of print history, the host device 1 and the printing device 2 may not receive an instruction for reprinting from a user.

Modification 6

In the above-described embodiment, print settings may not be changed. When the printing is satisfactory, reprinting may be performed without changing the print settings.

Modification 7

A method of executing the processing in the host device 1 and the printing device 2 according to the above-described embodiment, a program for executing the processing in the host device 1 and the printing device 2 according to the above-described embodiment, and a non-transitory computer-readable storage medium that stores the program are included within the scope of the present disclosure. Furthermore, the above-described embodiment may be combined with any of the modifications. The host device 1 may be, instead of the PC, various information processing terminals such as a tablet terminal or a smart phone. The host device 1 may comprise a plurality of devices, for example, a combination of a PC and a server computer. It is to be understood that various modifications may be made as appropriate without departing from the spirit and scope of the present disclosure, for example, the processing in the host device 1 and the printing device 2 may be implemented by cooperation of hardware and software.

Supplementary Notes

Hereinafter, supplementary notes of the printing device and the program will be described. The printing device 2 includes the printing device communication section 24 configured to receive a print job sent from the host device 1, the print mechanism 23 configured to perform printing of the received print job, the printing device storage section 25 configured to associate job information for identifying the print job with host information for identifying the host device 1 that has sent the print job after the printing of the print job, and the printing device control section 21 configured to receive an operation to change a setting of the print job and issue an instruction to send a changed print job in which the setting of the print job has been changed to the host device 1 that is identified by the host information associated with the job information about the print job.

With this configuration, when the printing device 2 receives a setting change operation to the print job from a user, the printing device 2 issues an instruction to send a changed print job in which a setting of the print job has been changed to the host device 1 that has been identified by the host information associated with the job information about the print job, and thus the changed print job can be printed.

In the printing device 2, the printing device control section 21 may provide the user with the print job list 41 (see FIG. 8) that is a list of printed print jobs. The user may select a print job from the provided print job list 41, and the printing device control section 21 may receive a setting change operation to the selected print job.

With this configuration, the printing device 2 can provide the user with the print job list 41, receive a selection of a print job, and issue an instruction to send a changed print job in which a setting of the selected print job has been changed to the host device 1.

In the printing device 2, with respect to the print job selected by the user, the printing device control section 21 may provide the user with setting items that can be changed, and issue an instruction to the host device 1 to send the changed print job in which the setting item selected by the user from the provided setting items has been changed.

With this configuration, the printing device 2 can provide the user with setting items that can be changed, receive a selection of a setting item, and issue, to the host device 1, an instruction to send a changed print job in which the selected setting item has been changed.

The printer driver 15*c* instructs the host control section 11 to function as an acquisition section configured to acquire a content, a first transmission control section configured to create a print job based on the acquired content and send the created print job to the printing device 2, a storage control section configured to instruct the host storage section 15 to store at least one of the acquired content and the created print job, and in accordance with at least one of an instruction to delete the content and an instruction to delete the print job, delete at least one of the target content and the target print job from the host storage section 15, and a second transmission control section configured to receive an instruction to change a setting of the print job from the printing device 2, read, from the host storage section 15, a target print job that is the print job to be a target of the setting change instruction or the content for creating the target print job, create a changed print job in which the setting of the target print job has been changed, and send the created changed print job to the printing device 2.

With this configuration, the host device 1 receives, from the printing device 2, a print job setting change instruction, creates a changed print job in which a setting of the print job has been changed, and sends the created changed print job to the printing device 2. Accordingly, the host device 1 can instruct the printing device 2 to print the changed print job. The host device 1 is configured to delete at least one of a content and a print job stored in the host storage section 15 in accordance with a deletion instruction, and thus the host storage section 15 can be prevented from reaching its capacity.

In the printer driver 15*c*, the host control section 11 receives, as a setting change instruction to a print job, the designation of job information for identifying the print job and a setting item to be changed, reads, from the host storage section 15, the target print job identified by the job information or the content for creating the target print job, and creates a changed print job in which a setting of the designated setting item in the target print job has been changed.

With this configuration, the host device 1 can receive the designation of a setting item to be changed from the printing device 2, and thus a changed print job in which the designated setting item has been changed can be created.

In the printer driver 15*c*, the host control section 11 may receive a deletion instruction from the printing device 2.

In this configuration, since the host device 1 receives a deletion instruction from the printing device 2, the host storage section 15 can be prevented from reaching its capacity without the deletion instruction operation by the user to the host device 1.

What is claimed is:

1. A printing device comprising:
   a receiver configured to receive a print job sent from a host device;
   a print section configured to perform printing of the received print job;
   a storage configured to store job information for identifying the print job and host information for identifying the host device that has sent the print job in association; and
   a controller configured to receive a setting change operation for the print job from a user, and send an instruction to the host device, which has been identified by the host information associated with the job information about the print job received from the host device in the past, to send a changed print job, in which a setting of the print job has been changed, from the host device to the printing device, wherein the print section receives and prints the changed print job without the user returning to the host device to create the changed print job and sending the changed print job to the receiver.

2. The printing device according to claim 1, wherein the controller is configured to provide the user with a print job list that is a list of the printed print jobs, and in response to a selection of one of the print jobs in the provided print job list by the user, receive a setting change operation to the selected print job.

3. The printing device according to claim 2, wherein with respect to the print job selected by the user, the controller provides the user with setting items that can be changed, and issues an instruction to the host device to send the changed print job in which the setting item selected by the user from the provided setting items has been changed.

4. The printing device according to claim 1, wherein
the controller is configured reject receipt of the setting change operation for the print job if the controller is notified that the host device deletes a content information that corresponds to the print job.

5. The printing device according to claim 1, wherein
the controller is configured to delete the job information and when the controller deletes the job information, the controller is configured to send a content deletion instruction to the host device.

6. The printing device according to claim 1, wherein
when one of the host device or the print device in a communication disabled state, in which communication is disabled, moves to a communication enabled state in which communication is enabled, the controller is configured to inquire of a sender of the print job if a content information, which corresponds to the print job, has been deleted.

7. A method of producing a changed print product by using a printing device comprising a receiver configured to receive a print job sent from a host device, and a print section configured to perform printing of the received job, the method comprising:
  following receiving the print job from the host device, receiving, by using the printing device, an operation of changing a setting of the print job from a user;
  sending an instruction from the printing device to the host device, which has been identified by host information associated with the job information about the print job received from the host device in the past, to send a changed print job in which the setting of the print job has been changed from the host device to the printing device;
  creating, by using the host device, a changed print job in which the setting of the print job has been changed and sending the changed print job to the printing device, the host device creating the changed print job without the user returning to the host device to create the changed print job;
  sending the changed print job from the host device to the printing device;
  receiving, by using the printing device, the changed print job and based on the changed print job; and
  printing a changed print product.

* * * * *